US012447708B2

(12) United States Patent
Wilcoxen et al.

(10) Patent No.: US 12,447,708 B2
(45) Date of Patent: Oct. 21, 2025

(54) BAGS OF STRETCHABLE FILMS WITH IMPROVED SEALS

(71) Applicant: THE GLAD PRODUCTS COMPANY, Oakland, CA (US)

(72) Inventors: Kyle R. Wilcoxen, Willowbrook, IL (US); Michael K. Kirk, Willowbrook, IL (US)

(73) Assignee: THE GLAD PRODUCTS COMPANY, Oakland, CA (US)

( * ) Notice: Subject to any disclaimer, the term of this patent is extended or adjusted under 35 U.S.C. 154(b) by 150 days.

(21) Appl. No.: 17/537,248

(22) Filed: Nov. 29, 2021

(65) Prior Publication Data

US 2022/0097336 A1 Mar. 31, 2022

Related U.S. Application Data

(62) Division of application No. 15/126,235, filed as application No. PCT/US2014/032146 on Mar. 28, 2014, now Pat. No. 11,214,034.

(51) Int. Cl.

| | |
|---|---|
| ***B31B 70/64*** | (2017.01) |
| ***B31B 70/00*** | (2017.01) |
| ***B65D 33/28*** | (2006.01) |
| *B31B 70/16* | (2017.01) |
| *B31B 70/88* | (2017.01) |

(Continued)

(52) U.S. Cl.

CPC .............. *B31B 70/64* (2017.08); *B31B 70/00* (2017.08); *B31B 70/642* (2017.08); *B65D 33/28* (2013.01); *B31B 70/16* (2017.08); *B31B 70/88* (2017.08); *B31B 2155/002* (2017.08); *B31B 2160/10* (2017.08); *B65D 75/006* (2013.01)

(58) Field of Classification Search

CPC ....... B31B 70/64; B31B 70/00; B31B 70/642; B31B 70/88; B31B 2155/002; B31B 70/16; B31B 2160/10; B65D 33/28; B65D 75/006

USPC .......................................................... 493/205

See application file for complete search history.

(56) References Cited

U.S. PATENT DOCUMENTS

| | | | |
|---|---|---|---|
| 235,449 A | 12/1880 | Newton | |
| 584,555 A | 6/1897 | Lorenz | |

(Continued)

FOREIGN PATENT DOCUMENTS

| | | | | |
|---|---|---|---|---|
| EP | 1 795 331 A1 | 6/2007 | | |
| WO | WO 9426597 A1 | 11/1994 | | |
| WO | WO-2019212672 A1 * | 11/2019 | ............ | B29C 65/56 |

OTHER PUBLICATIONS

International Search Report, mailed Aug. 22, 2014, from counterpart PCT/US14/032146, filing date Mar. 28, 2014.

(Continued)

*Primary Examiner* — Sameh Tawfik

(74) *Attorney, Agent, or Firm* — Keller Preece PLLC

(57) ABSTRACT

In one example, a plastic product such as a plastic bag includes one or more seals. One of the seals includes respective portions of first and second plastic films that are arranged one on top of the other. The respective portions are joined together and are aligned generally parallel to a direction of elongation associated with the plastic films, where the direction of elongation is a direction in which the plastic films elongate when under load. As well, the respective portions extend along a length of the joined plastic films and have a length that is greater than a length of the plastic films.

20 Claims, 9 Drawing Sheets

(51) Int. Cl.

| | |
|---|---|
| *B31B 155/00* | (2017.01) |
| *B31B 160/10* | (2017.01) |
| *B65D 75/00* | (2006.01) |

(56) References Cited

U.S. PATENT DOCUMENTS

| | | | | |
|---|---|---|---|---|
| 605,343 | A | 6/1898 | Ross | |
| 659,266 | A | 10/1900 | Stewart | |
| 728,828 | A | 5/1903 | Arkell | |
| 782,977 | A | 2/1905 | Madden | |
| 1,507,949 | A | 9/1924 | Angier | |
| 1,582,842 | A | 4/1926 | Lorenz | |
| 1,853,374 | A | 4/1932 | Leopold | |
| 1,962,071 | A | 6/1934 | Greene | |
| 2,007,047 | A | 7/1935 | Gibbs | |
| 2,158,929 | A | 5/1939 | Dunajeff | |
| 2,177,490 | A | 10/1939 | Kieffer | |
| 2,257,428 | A | 9/1941 | Ruegenberg | |
| 2,653,751 | A | 9/1953 | Vogt | |
| 2,679,887 | A | 6/1954 | Doyle et al. | |
| 2,999,042 | A | 9/1961 | Meister | |
| 3,120,336 | A | 2/1964 | Whatley, Jr. | |
| 3,997,920 | A | 12/1976 | Dewoskin | |
| 4,153,751 | A | 5/1979 | Schwarz | |
| 4,343,848 | A | 8/1982 | Leonard, Jr. | |
| 4,436,576 | A | 3/1984 | Seiden | |
| 4,931,034 | A | 6/1990 | Wagner | |
| 5,076,040 | A | 12/1991 | Davis | |
| 5,152,613 | A | 10/1992 | Herrington, Jr. | |
| RE34,477 | E | 12/1993 | Cornwell | |
| 5,650,214 | A | 7/1997 | Anderson et al. | |
| 5,723,087 | A | 3/1998 | Chappell et al. | |
| 5,891,544 | A | 4/1999 | Chappell et al. | |
| 5,899,047 | A | 5/1999 | Weder et al. | |
| 5,968,029 | A | 10/1999 | Chappell et al. | |
| 5,974,769 | A | 11/1999 | Vetter | |
| 6,224,528 | B1 | 5/2001 | Bell | |
| 6,394,651 | B2 | 5/2002 | Jackson | |
| 6,394,652 | B2 | 5/2002 | Meyer et al. | |
| 6,562,166 | B2 | 5/2003 | Molander et al. | |
| 6,605,172 | B1 | 8/2003 | Anderson et al. | |
| 7,219,483 | B2 | 5/2007 | Adair, Jr. et al. | |
| 7,820,875 | B2 | 10/2010 | Roe et al. | |
| 8,506,165 | B2 * | 8/2013 | Shinozaki | B65D 75/585 229/87.05 |
| 9,186,862 | B2 | 11/2015 | Broering et al. | |
| 9,452,853 | B2 | 9/2016 | Doll | |
| 11,072,108 | B2 * | 7/2021 | Kocher | B29C 53/285 |
| 11,220,085 | B2 * | 1/2022 | Siqueira | B32B 37/0053 |
| 2006/0093766 | A1 | 5/2006 | Savicki et al. | |
| 2007/0278114 | A1 * | 12/2007 | Kane | B65D 25/08 206/219 |
| 2009/0233041 | A1 | 9/2009 | Rasmussen | |
| 2010/0098354 | A1 * | 4/2010 | Fraser | B65F 1/0006 383/105 |
| 2010/0278454 | A1 * | 11/2010 | Huffer | B65D 75/5838 383/203 |
| 2011/0117307 | A1 * | 5/2011 | Fraser | B32B 37/0076 156/290 |
| 2011/0132976 | A1 | 6/2011 | Drewnowski et al. | |
| 2012/0064271 | A1 * | 3/2012 | Broering | B32B 7/05 156/290 |
| 2013/0259408 | A1 * | 10/2013 | Borchardt | B32B 3/30 428/167 |
| 2015/0003757 | A1 * | 1/2015 | Wilcoxen | B32B 37/0076 428/167 |
| 2022/0258449 | A1 * | 8/2022 | Wilcoxen | B32B 27/306 |
| 2023/0312201 | A1 * | 10/2023 | Steenblock | B29C 59/04 383/75 |

OTHER PUBLICATIONS

U.S. Appl. No. 15/126,235, Jan. 29, 2019, Office Action.
U.S. Appl. No. 15/126,235, Jul. 12, 2019, Office Action.
U.S. Appl. No. 15/126,235, Mar. 6, 2020, Office Action.
U.S. Appl. No. 15/126,235, Apr. 29, 2020, Office Action.
U.S. Appl. No. 15/126,235, Jun. 24, 2021, Office Action.
U.S. Appl. No. 15/126,235, Oct. 18, 2021, Notice of Allowance.
Office Action as received in Canadian application 2,943,977 dated Feb. 5, 2020.
Examination Report as received in Australian application 2014388350 dated Jan. 23, 2019.

* cited by examiner

BAGS OF STRETCHABLE FILMS WITH IMPROVED SEALS

CROSS REFERENCE TO RELATED APPLICATIONS

This application is a division of U.S. patent application Ser. No. 15/126,235, filed Sep. 14, 2016, which is a National Stage Entry of International Patent Application No. PCT/US14/32146 filed Mar. 28, 2014. Each of the aforementioned applications are hereby incorporated by reference in their entirety.

BACKGROUND

Products such as plastic bags require one or more seals, such as side seals and/or hem seals for example, to prevent leakage or other egress of materials from the interior of the plastic bag and/or for other purposes. In such products, the side seals are typically created by melting, or welding, the plastic layers, or films, of the bag together. The resulting seal is strong, but static. That is, the seal performs well in use so long as there is no significant elongation of the plastic bag material in the direction of the seal. However, some applications require plastic bags that are able to elongate, possibly substantially, during use. For example, because trash bags are expected to be used with materials that may be heavy and/or wet, such trash bags should be able to undergo some degree of elongation during use.

Considerations such as these have led to the development of plastic bags constructed of web materials, such as those disclosed in the related patents referred to herein, that possess the ability to elongate to some extent during use while also substantially maintaining their strength and integrity. While such properties have proven to be useful and effective in many cases, problems have arisen where stretchable plastic products such as trash bags employ a seal that is static in nature and that extends in generally the same direction, or directions, along which either temporary or permanent elongation is expected to occur during normal use.

In particular, a few different failure mechanisms relating to the seal are known to exist. These failure mechanisms may appear singly or together in any given product. As noted above, plastic bags constructed of web materials may include seals that are formed by a melting and fusing, i.e. welding or ultrasonic, process. This process produces a relatively strong seal that is resistant to elongation or other deformation. Because the seal is relatively stronger than the web material, especially in the localized portions of the web material adjacent to the seal, the web material and seal may respond differently to loading. For example, the web material may deform around the seal region when a load is applied to the plastic bag. In this failure mechanism, the strength and integrity of the web material can be compromised, even if the seal is largely unaffected by the applied load. In some cases, the failure of the plastic bag is indicated by the formation of pin holes in the web structure in the vicinity of the seal. Such pin holes can become noticeable to consumers when they lead to a catastrophic side seal failure or when fluid leaks out of the bag through the pin holes. Such failure or leakage is of great concern to consumers.

Another example of a failure mechanism involves the seal itself. In particular, application of a load to the material of the plastic bag not only causes elongation of the bag material, but also causes elongation and/or other deformation of the seal. However, the seal of the plastic bag is not designed or intended to undergo any significant elongation when a load is applied. Thus, application of a sufficiently large load can cause elongation and/or other deformation of the seal that can compromise, or destroy, the strength and/or integrity of the seal. Such damage to the seal can be manifested as tears and leaks.

As the foregoing accordingly makes clear, there is a need for products such as flexible plastic bags that include one or more seals configured and constructed to maintain their integrity and performance, as well as that of the adjoining bag material, even when the bag elongates in response to loading.

BRIEF SUMMARY OF AN EXAMPLE EMBODIMENT

One or more embodiments within the scope of the invention may be effective in overcoming one or more disadvantages in the art. One example embodiment is directed to a bag constructed of a pair of plastic films. Each of the plastic films is in the form of a flexible structure constructed such that when the plastic film is subjected to loading, the plastic film is able to elongate, or stretch, while also substantially maintaining its strength and integrity at the same time. The bag further includes a side seal that seals the plastic films together. The side seal is longer, possibly substantially longer, than an unelongated length of a side of the bag. Because the side seal is relatively long, the side seal maintains its strength and integrity even when subjected to loads that cause elongation of the flexible bag material. Likewise, the flexible bag material located proximate the seal is able to maintain its strength and integrity due to the length of the seal. Finally, the relatively long length of the seal permits it to elongate, or stretch, in a relatively consistent manner when the bag incorporating the seal is subjected to loading.

The foregoing embodiment is provided solely by way of example and is not intended to limit the scope of the invention in any way. Consistently, various other embodiments of a seals, stretchable films, and associated production processes, within the scope of the invention are disclosed herein.

BRIEF DESCRIPTION OF THE DRAWINGS

The appended drawings contain figures of example embodiments to further illustrate and clarify various aspects of the present invention. It will be appreciated that these drawings depict only example embodiments of the invention and are not intended to limit its scope in any way. Aspects of the invention will be described and explained with additional specificity and detail through the use of the accompanying drawings in which.

DETAILED DESCRIPTION

Figure 1A:
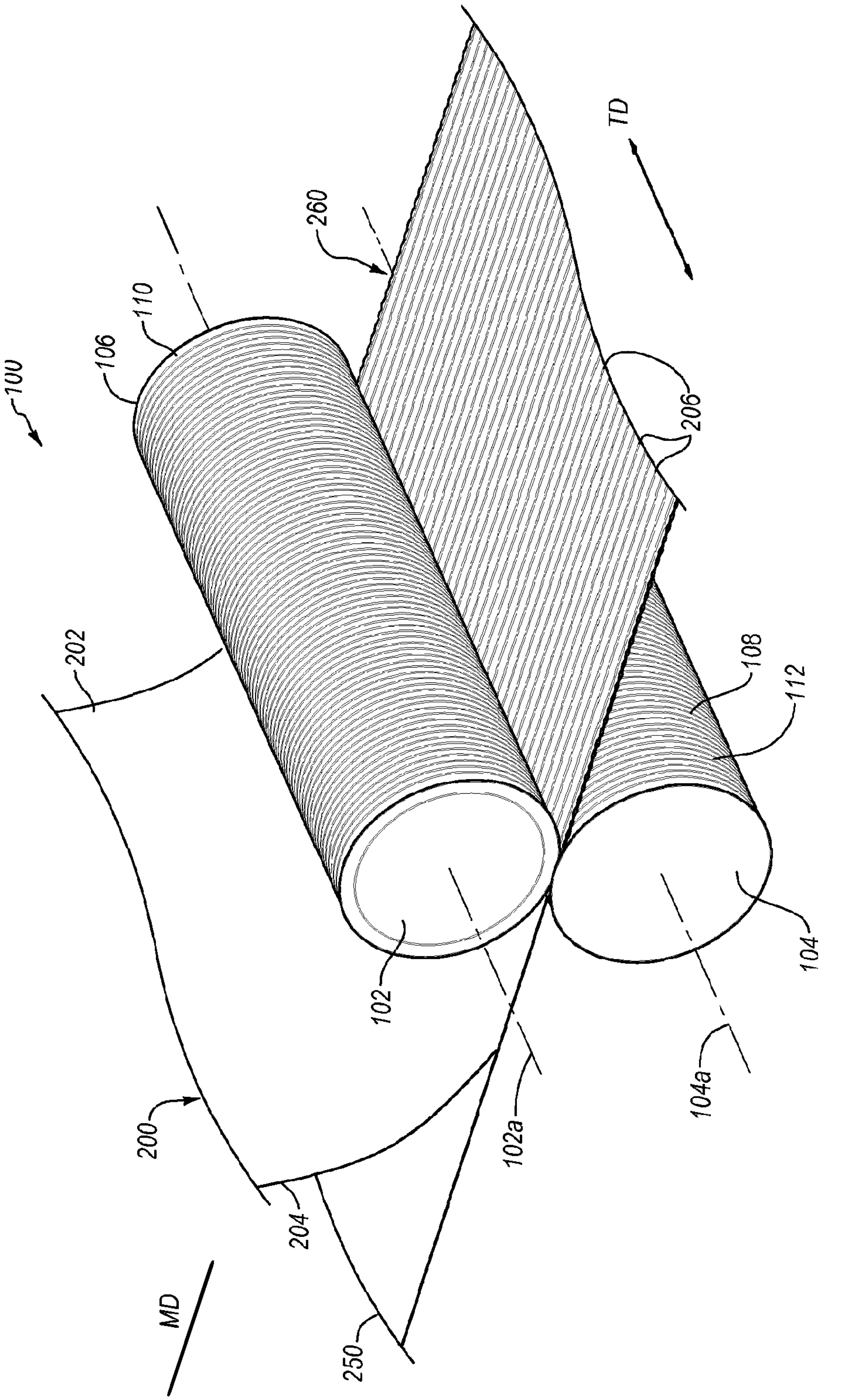
FIGS. 1A and 1B disclose aspects of a TD machine and associated TD ring rolling process.

Example embodiments of the invention generally concern stretchable plastic films that are designed to hold liquid and/or solid materials and that include one or more seals. At least one of the seals is longer, possibly substantially longer, than an unelongated length of a side of the plastic film so that the seal is able to elongate in tandem with the film structure when the film structure is subjected to loading. This configuration permits both the seal and surrounding film structure to maintain their strength and integrity when a load is imposed that causes the film structure to elongate. Yet other embodiments are directed to methods for producing such sealed plastic films. The plastic films and seals disclosed herein may be employed in a variety of different end products, examples of which include, but are not limited to, grocery bags, trash bags, sacks, yard waste bags, packaging materials, feminine hygiene products, baby diapers, adult incontinence products, sanitary napkins, bandages, food storage bags, food storage containers, thermal heat wraps, facial masks, wipes, and hard surface cleaners.

A. Aspects of Various Example Embodiments

It should be noted that the embodiments disclosed herein do not constitute an exhaustive summary of all possible embodiments, nor does the following discussion constitute an exhaustive list of all aspects of any particular embodiment(s). Rather, the following discussion simply presents selected aspects of some example embodiments. It should likewise be noted that nothing herein should be construed as constituting an essential or indispensable element of any invention or embodiment. Rather, and as the person of ordinary skill in the art will readily appreciate, various aspects of the disclosed embodiments may be combined in a variety of ways so as to define yet further embodiments. Such further embodiments are considered as being within the scope of this disclosure. As well, none of the embodiments embraced within the scope of this disclosure should be construed as necessarily resolving, or being limited to the resolution of, any particular problem(s). Nor should such embodiments be construed to necessarily implement, or be limited to implementation of, any particular effect(s).

Plastic films and associated seals within the scope of this disclosure may possess or exhibit a variety of different physical and visual characteristics. Examples of such characteristics include, but are not limited to, seals having a generally non-linear configuration when in a substantially undeformed state, plastic films in the form of web materials, relatively thick and wide seals that may present consumer noticeable benefits such as the appearance of a wet seal and/or color change between plastic film layers that have been sealed together, and seals having the same, or a different, color as the plastic film layers that are joined by the seal.

Illustrative examples of seals having a non-linear configuration include, but are not limited to, seals having a zigzag shape, seals with a sinusoidal shape, seals with other types of serpentine shapes, seals whose length is greater than a length of a substantially unelongated film to which the seal has been applied, and seals whose length is approximately the same as a length of an elongated film to which the seal has been applied. Illustrative examples of plastic films include any and all of the web materials disclosed in the various United States patents disclosed herein. Such film structures are incorporated into products such as those sold under the ForceFlex® trademark.

As suggested by the foregoing general considerations, plastic films, seals, and products within the scope of this disclosure may include one or more of the following, in any suitable combination: one or more plastic films configured to elongate under loading; one or more plastic films configured to elastically elongate under loading; one or more plastic films comprised of a web material; a plastic film including a stretchable web; a seal for plastic films, where the seal has a generally non-linear configuration at least when the seal is in a substantially unelongated state; a seal for plastic films, where the seal has a generally non-linear configuration only when the seal is in a substantially unelongated state; a seal for plastic films, where the seal has a generally linear configuration when the seal is in a substantially elongated state; a seal for plastic films, where the seal has a generally linear configuration only when the seal is in a substantially elongated state; a seal for plastic films, where the seal configuration is generally in a zigzag or serpentine shape, such as sinusoidal for example, when the seal is in a substantially unelongated state; a pair of plastic films attached to each other with any of the aforementioned seals; a pair of plastic films attached to each other with any of the aforementioned seals, where one or both of the plastic films comprises a web material; any seal bar and/or other device(s) configured to form any one or more of the aforementioned seals; and, any end product including any or more of the foregoing films, seals, or combinations of films and seals.

It will be appreciated from the foregoing, and the other disclosure herein, that a variety of different embodiments may be defined. Some examples of such embodiments are set forth below. Such embodiments are not intended to limit the scope of the invention in any way.

In a first example embodiment, two plastic films are joined together with a seal that has a generally non-linear configuration at least when the plastic films are in a substantially unelongated state.

In a second example embodiment, two plastic films are joined together with a seal that has a generally non-linear configuration at least when the plastic films are in a substantially unelongated state, and one or both of the plastic films comprises a web material.

In a third example embodiment, two plastic films are joined together with a seal that has a generally zigzag or serpentine configuration at least when the plastic films are in a substantially unelongated state.

In a fourth example embodiment, two plastic films are joined together with a seal that has a generally zigzag or serpentine configuration at least when the plastic films are in a substantially unelongated state, and one or both of the plastic films comprises a web material.

In a fifth example embodiment, two plastic films are joined together with a seal whose unelongated length exceeds a length of the plastic films when the plastic films are in a substantially unelongated state.

In a sixth example embodiment, an end product includes any of the aforementioned example embodiments.

In a seventh example embodiment, a plastic bag includes any of the aforementioned example embodiments.

In an eighth example embodiment, a seal bar is configured to form any one or more of the seals of the aforementioned example embodiments, and the seal bar can operate in one or both of the machine direction (MD) and the transverse direction (TD).

In a ninth example embodiment, two plastic films are joined together by heat sealing to form a seal extending generally parallel to the MD, where the seal has a generally non-linear configuration.

In a tenth example embodiment, two plastic films are first stretched in the MD and then joined together by heat sealing to form a seal extending generally parallel to the MD, where the seal has a generally non-linear configuration, and where the plastic films are stretched by a cold deformation process, examples of which include MD SELFing (where 'SELF' refers to "structural elastic like film"), and ring rolling.

In an eleventh example embodiment, two plastic films are joined together by heat sealing to form a seal extending generally parallel to the TD, where the seal has a generally non-linear configuration.

In a twelfth example embodiment, two plastic films are first stretched in the TD and then joined together by heat sealing to form a seal extending generally parallel to the TD, where the seal has a generally non-linear configuration, and where the plastic films are stretched by a cold deformation process, examples of which include TD SELFing and ring rolling.

In further example embodiments, any of the aforementioned processes used in whole or in part to produce an end product that includes any of the aforementioned seals and plastic films.

B. Example Film Materials and Structures

A wide variety of plastic films may be employed in the manufacture of products such as the examples disclosed herein. These films may comprise any flexible or pliable material, including thermoplastic materials that can be formed or drawn into a film. Adjuncts may also be included, as desired. Examples of such adjuncts include coloring agents such as pigments, dyes, and dilute pigments, slip agents, voiding agents, anti-block agents, tackifiers, and combinations of the foregoing.

The thermoplastic material of the films of one or more embodiments can comprise or consist of any combination of the thermoplastics and other materials disclosed herein. Moreover, these materials and combinations of materials can be formed in single or multiple layers. As well, and depending upon considerations such as the nature and/or intended use of the associated product, the thermoplastic material may be opaque, transparent, translucent, or tinted. Furthermore, the material used for some or all portions of at least some products may be a gas impermeable material.

Example thermoplastics and other materials suitable for the films disclosed herein include, but are not limited to, thermoplastic polyolefins, including polyester, polyethylene, polypropylene, and copolymers thereof. Example polyethylenes include high density polyethylene, low density polyethylene, linear low density polyethylene, polypropylene, ethylene vinyl acetate, nylon, polyester, and ethylene vinyl alcohol, ethylene methyl acrylate. Besides ethylene and propylene, exemplary copolymer olefins include, but are not limited to, ethylene vinylacetate (EVA), ethylene methyl acrylate (EMA) and ethylene acrylic acid (EAA), or blends of such olefins. Other suitable thermoplastics include the family of synthetic polymers known generically as aliphatic polyamides, and sometimes referred to as nylon.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber, and combinations of the foregoing.

Plastic films employed in connection with embodiments of the invention can vary not only as to their chemical composition, but also as to their physical form. One particular example of a plastic film is a plastic film comprised of a web material. Examples of such web materials are disclosed in the various United States patents referenced herein. Such web materials may comprise, for example, stretchable polyolefin webs, although, as noted above, other materials can alternatively be employed in the construction of stretchable webs. The web materials may include strainable networks that can be formed using a variety of processes such as MD ring rolling and/or TD ring rolling, or MD SELFing and/or TD SELFing.

With reference to the foregoing, it should be noted that as used herein, the term "machine direction" or "MD" refers to the direction along the length of the plastic film, or in other words, the direction that the plastic film moves as the plastic film is sealed to another plastic film. Likewise, the term "transverse direction" or "TD" refers to the direction across the plastic film or generally perpendicular to the MD.

The extent to which a particular web material is stretchable can vary depending upon the process or processes used to create that web material. By way of illustration, a web material formed by SELFing is typically more stretchable than a web material formed by ring rolling. In any case, embodiments of the invention are not limited to the sealing of plastic films that have been formed by an particular process(es). More generally, embodiments of the invention embrace, among other things, the sealing of any stretchable or elongated plastic films, where such plastic films include plastic films that comprise a web material.

C. Example Production Equipment

Figure 1B:
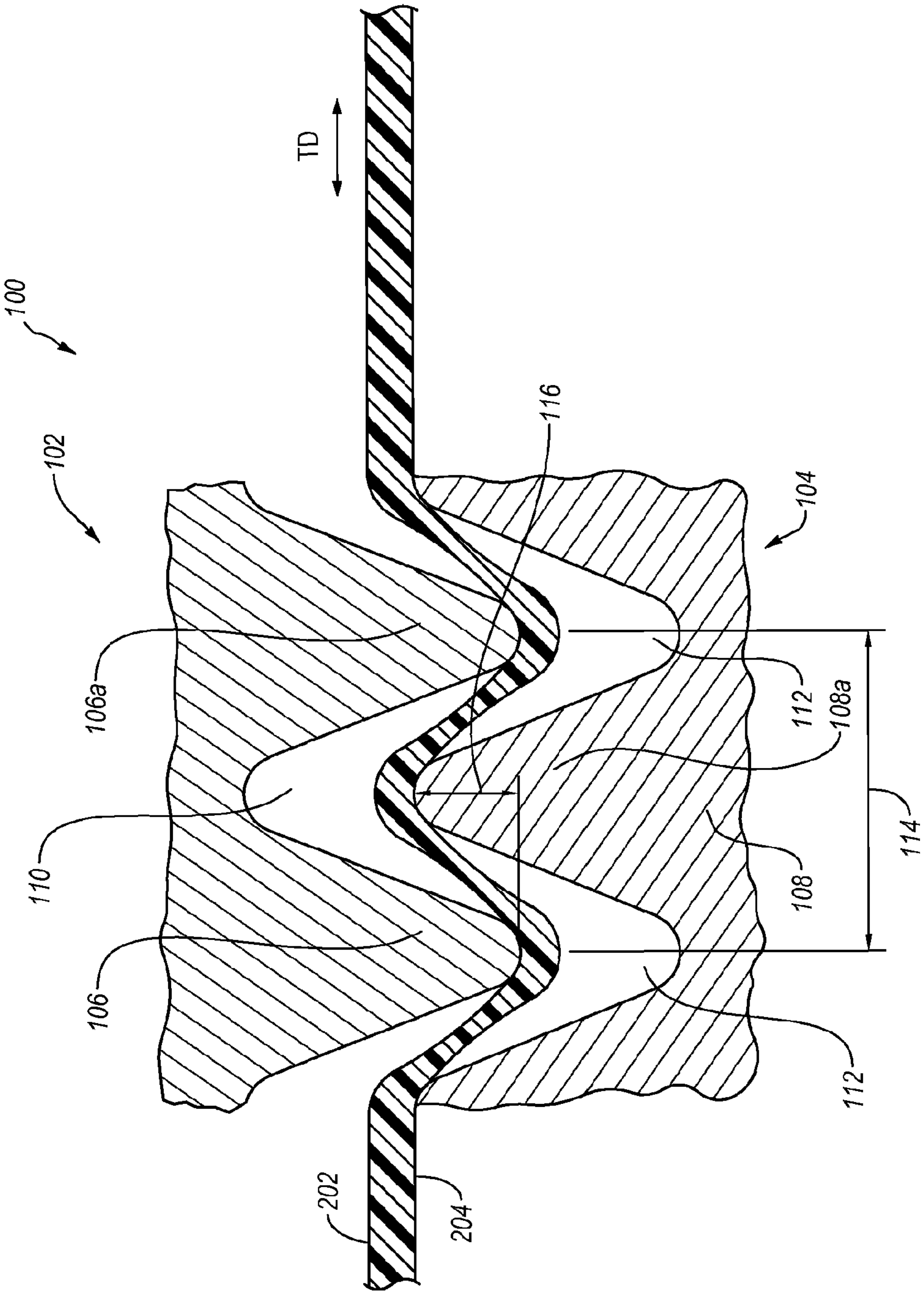

With reference now to FIGS. 1A-1B, details are provided concerning aspects of a machine 100 that may be employed in conjunction with two or more films, such as films 200 and 250 for example, to produce one or more of the plastic products, or portions thereof, disclosed herein. One or both of the example films 200 and 250 may be stretchable and may take the form of a plastic film comprised of a web material. As well, one or both of the films 200 and 250 can take the form of a multilayer film. In at least some embodiments, the films 200 and 250 may comprise respective portions of a single piece of material that has been folded. As demonstrated by the example of film 200, the film 200 can have an initial thickness or starting gauge defined by the distance between the top surface 202 and bottom surface 204 of the film 200. The starting gauges of the individual films 200 and 250 can be substantially uniform along their respective lengths, although that is not required.

Figure 2:
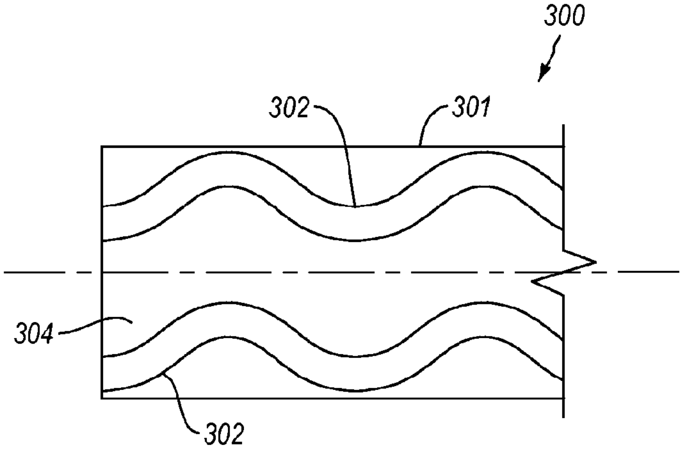
FIG. 2 is a top view of a portion of an example seal bar.

With more particular reference now to the machine 100, FIGS. 1A-1B and FIG. 2 disclose portions of a machine 100 that is operable to seal two or more plastic films together to form one or more of the products disclosed herein, such as plastic bags for example. The machine 100 can implement a TD ring rolling, or SELFing, process that serves to stretch, or impart a strainable network, one or both of the films 200 and 250 prior to the time that those films 200 and 250 are sealed together. More specifically, the films 200 and 250 in this example are passed through a pair of TD intermeshing rollers 102 and 104. As a result of TD ring rolling, the films 200 and 250 are intermittently stretched in the transverse direction.

Figure 1C:
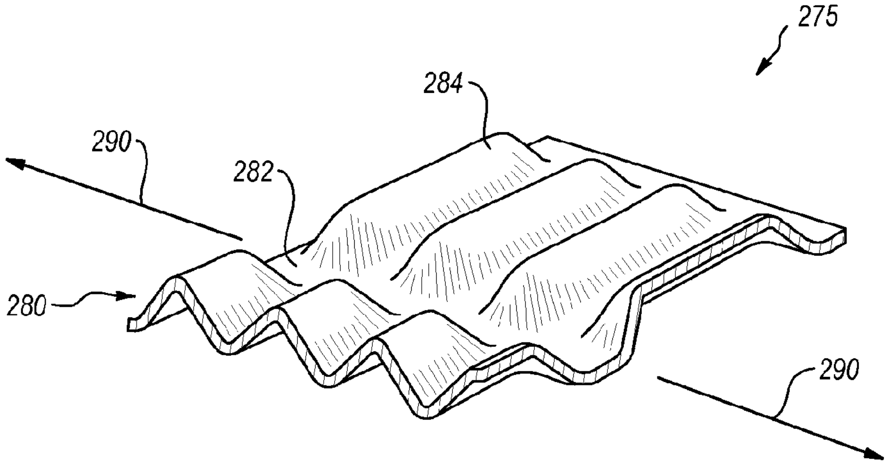
FIG. 1C discloses one type of stretchable material suitable for a bag or other product, where the material is shown in an un-stretched state.
Figure 1D:
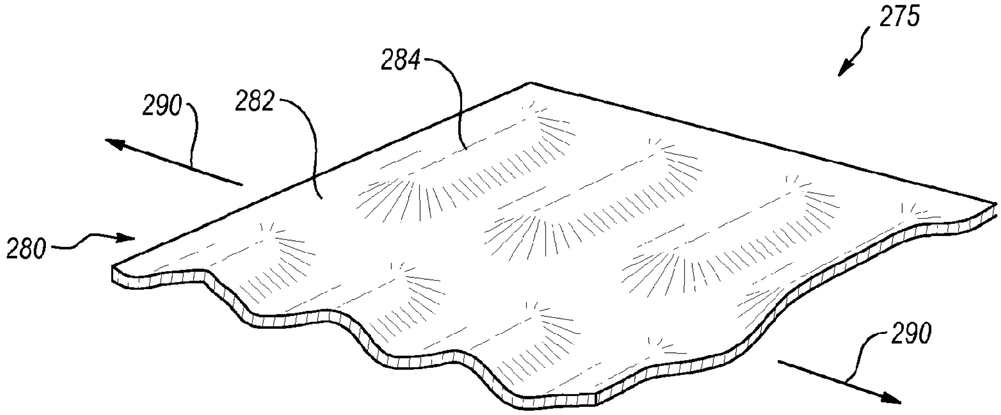
FIG. 1D discloses one type of stretchable material suitable for a bag or other product, where the material is shown in a stretched state.

The stretching may be elastic, such that the films 200 and 250 are stretched only temporarily and return to their initial size and configuration after a period of time, such as after the films 200 and 250 have been sealed together. Alternatively, the stretching of the films 200 and 250 can be plastic, such that the films 200 and 250 remain stretched, to some extent at least, well after processing by the machine 100 is completed. In either case however, and as illustrated by the example of FIGS. 1C and 1D discussed below, the films 200 and 250 may be stretchable in use, such as when the films 200 and 250 are used to form a product such as a plastic bag for example.

In one or more implementations, stretching the films 200 and 250 in the transverse direction can temporarily, or permanently, reduce the gauge of the films 200 and 250 and increase the width of the films 200 and 250. Furthermore, in one or more implementations, stretching the films 200 and 250 in the transverse direction can reduce the length of the films 200 and 250. For example, as the films 200 and 250 are widened in the transverse direction, the length of the films 200 and 250 can be reduced in the machine direction.

As indicated in the example of FIG. 1A, the first roller 102 and the second roller 104 can each have a generally cylindrical shape, and are operable to rotate in opposite directions about respective parallel axes of rotation 102*a* and 104*a* that may be generally parallel to the transverse direction TD and generally perpendicular to the machine direction MD. The rollers 102 and 104 each include a respective plurality of radially protruding ridges 106 and 108 that extend along the respective rollers 102 and 104 in a direction generally perpendicular to the axes of rotation 102*a* and 104*a*. As shown in FIG. 1B, respective tips 106*a* and 108*a* of ridges 106 and 108 can have a variety of different shapes and configurations, including the rounded shape as shown. As further indicated in FIG. 1B, the ridges 106 are separated by grooves 110, while the ridges 108 are separated by grooves 112.

In at least one implementation, the ridges 106 and 108 are staggered relative to each other so that the grooves 110 can receive at least a portion of the ridges 108 as the rollers 102 and 104 intermesh with each other. Correspondingly, the grooves 112 can receive at least a portion of the ridges 106. In at least some instances, the configuration of the ridges 106 and 108 and grooves 110 and 112 can prevent substantial contact between ridges 106 and 108 during intermeshing such that little or no rotational torque is transmitted during operation. Additionally, the configuration of the ridges 106 and 108, and of the grooves 110 and 112, can affect the amount of stretching as the films 200 and 250 pass through the rollers 102 and 104.

With continued reference to FIGS. 1A and 1B, the pitch and depth of engagement of the ridges 106 and 108 can determine, at least in part, the amount of incremental stretching caused by the intermeshing rollers 102 and 104. As shown in FIG. 1B, where for the purposes of clarity only film 200 is illustrated, the pitch 114 is the distance between the tips of two adjacent ridges on the same roller. The depth of engagement (DOE) 116 is the amount of overlap between adjacent ridges 106 and 108 of the rollers 102 and 104 during intermeshing.

As is evident from the foregoing, various parameters of the machine 100 may be selected and implemented depending upon the effect(s) desired to be achieved. For example, the ridge pitch and/or DOE may be varied as necessary. Merely because these parameters, and others, may be varied however, such variations will not necessarily be evident to one of ordinary skill in the art, and may, in some instances at least, be arrived at only after substantial experimentation and trials.

As indicated in FIGS. 1A and 1B, the direction of travel of the films 200 and 250 through the intermeshing rollers 102 and 104 is generally in the machine direction and generally perpendicular to the transverse direction, although the opposite arrangement could also be employed. As the films 200 and 250 pass between the intermeshing rollers 102 and 104, the ridges 106 and 108 incrementally stretch the films 200 and 250 in the transverse direction. In particular, and as best shown in FIG. 1B, as the films, exemplified by the single film 200, proceed between the intermeshing rollers 102 and 104, the ridges 106 of the first roller 102 can push film 200 into the grooves 112 of the second roller 104, and the ridges 108 of the second roller 104 can also push the film 200 into the grooves 110 of the first roller 102. The pulling of the film 200 by the ridges 106 and 108 can stretch the film 200. Similar, or identical, effects would be achieved with respect to film 250 such that as the films 200 and 250 proceed between the intermeshing rollers 102 and 104, the ridges 106 and 108 can impart form a striped pattern 206 into the TD incrementally-stretched film 260, which includes both films 200 and 250, with visually-distinct stretched regions.

In connection with the foregoing, it should be noted that the rollers 102 and 104 need not necessarily stretch the films 200 and 250 evenly along their lengths. For example, in some embodiments, the rollers 102 and 104 can stretch the portions of the films 200 and 250 between the ridges 106 and 108 relatively more than the portions of the films 200 and 250 that contact the ridges 106 and 108. More generally, the scope of the invention is not limited to any particular stretching process and the foregoing are provided by way of example only.

With continued attention to FIGS. 1A and 1B, and directing attention now as well to FIGS. 1C and 1D, details are provided concerning an example stretchable material 275, and a response of that material 275 to application of a tensile force. As indicated in the Figures, the stretchable material 275 may include a pattern 280 that forms a strainable network that may include a plurality of first regions 282 and a plurality of second regions 284. The second regions 284 may be formed as rib-like elements in the stretchable material 275 such that the first regions 282 and second regions 284 appear bunched or contracted together in the un-stretched state illustrated in FIG. 1C.

When a tensile force is applied (as indicted by the arrows 290 in FIG. 1D) or during normal use of a product including the stretchable material 275, the second regions 284 are able to unbend or geometrically deform such that the stretchable material 275 assumes the stretched state in FIG. 1D where the first and second regions 282 and 284, respectively, may be substantially coplanar with each other. As will be appreciated, application of a tensile force stretches or elongates the pattern 280 so as to effectively increase the overall area of the stretchable material 275. In addition to accommodating bulky and/or heavy objects and materials, the strainable networks provide shock dampening when objects or materials are suddenly thrust or dropped into a product formed by the stretchable material 275.

With reference to the discussion of FIGS. 1A-1D, it should be noted that a stretching process such as TD ring rolling, or SELFing, is one example of a method suitable to elongate films by incremental stretching of the films in the transverse direction. A stretching process such as MD ring rolling, or SELFing, is another suitable method of elongating films by incremental stretching of the films in the machine direction. Stretching processes such as TD ring rolling and MD ring rolling, may be used together, alone, or in conjunction with other processes. While not specifically illustrated, an MD ring rolling machine and associated process may be similar, respectively, to the TD ring rolling machine and associated process, though the rollers of an MD ring rolling machine include ridges and grooves that extend generally perpendicular to the MD direction, rather than parallel to the MD direction, as in the case of a TD machine and process.

Turning now to FIG. 2, details are provided concerning a seal bar, one example of which is denoted at 300, that may be employed to seal two or more films together. In at least some instances, one or more embodiments of the seal bar 300 can be employed in conjunction with equipment such as the machine 100 disclosed in FIGS. 1A-1B, although that is not required.

In general, embodiments of the seal bar 300 can be heated and pressed onto two or more plastic films so as to melt the film materials in the area of the seal bar 300, creating a seal that holds the two or more plastic films together. Embodiments of the seal bar 300 can be oriented so as to create a seal in the machine direction. Embodiments of the seal bar 300 can alternatively be oriented so as to create a seal in the transverse direction, and/or any other desired direction(s). Still other embodiments can employ multiple seal bars arranged so that seals are created, in a single product, both in the machine direction and in the transverse direction, and/or in any other desired direction(s). As well, one or more seals can be created, in a single instance of a product, in the machine direction and/or in the transverse direction, and/or in any other desired direction(s). By way of illustration, a single instance of a product may include multiple side seals and hem seals. Each set of multiple seals, such as a pair of side seals for example, can be created with a single seal bar having multiple sealing elements, or multiple seal bars that each have only a single sealing element.

The seal bar 300 can be constructed of any suitable material(s), examples of which include steel, aluminum, and aluminum alloys. In some instances at least, the seal bar 300 takes the form of machined bar stock. As suggested above, a seal bar can be configured to apply one, or more, seals, of any of a variety of desired configurations, to two or more plastic films. In the example of FIG. 2, the seal bar 300 has a body 301 that includes a pair of sealing elements 302 that protrude from the body 301 and are separated by a gap 304. In at least some embodiments, the sealing elements 302 are integral with the body 301. Each sealing element 302 has a generally sinusoidal shape and the sealing elements 302 are substantially parallel with each other. As disclosed elsewhere herein, the sealing elements 302 need not have a sinusoidal shape however. Moreover, where a seal bar includes multiple sealing elements, the sealing elements may, or may not, be substantially identical to each other. For example, a sealing element with a sinusoidal shape could be combined, in a single seal bar, with a sealing element having a zigzag shape. In one alternative to the seal bar 300, only a single sealing element 302 is provided.

More generally, the sealing elements 302 may each define a seal length that is longer than a portion of a film, which may be elongated or unelongated at the time of sealing, to which the sealing element 302 is applied. As used herein, it should be noted that the "seal length" refers not to the straight line distance between the ends of the sealing element 302, but rather to the full length of the sealing path defined by the sealing element 302.

Figure 3:
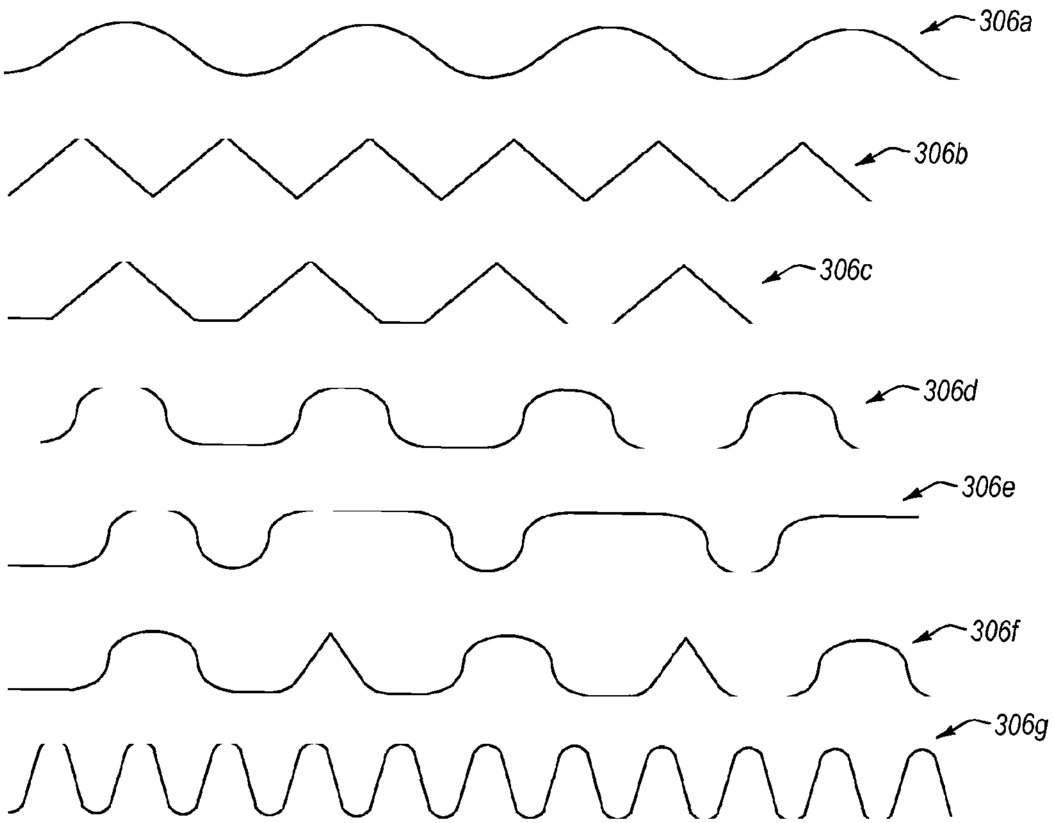
FIG. 3 discloses various example sealing element configurations.

As noted in the following examples, the sealing element 302 can take a wide variety of different forms. By way of illustration, the sealing element 302 may define a seal whose length is greater than a length of a side, or bottom, of a plastic bag that is created in part with the sealing bar 300. Thus, and with reference to FIG. 3, other example embodiments, such as sealing elements 306*a*-306*g* may have a non-sinusoidal serpentine shape, a zigzag shape, or any other non-linear shape, or a combination of shapes. As well, further example embodiments of the sealing element can include both linear portions, such as tooth-shaped portions of a zigzag shape for example, and non-linear portions, such as serpentine-shaped portions of a sinusoidal shape for example. Consistent with the foregoing, a "non-linear" seal shape, as that term is used herein, embraces sealing elements that, while they may comprise, or consist of, linear portions, define a sealing path whose length is greater than the straight line distance between the ends of that sealing path.

With continued reference now to the example seal bar 300, the sealing surfaces of the sealing elements 302 of the seal bar 300 may include a plasma coating such as the Plasma 300 Series PC-315 by Plasma Coatings, 11415 Gulf Stream Ave., Arlington, TN In one example embodiment, this particular coating may be applied to an aluminum sealing surface of the sealing element 302 such that the coating has a thickness in a range of about 0.004" to about 0.006," although other thicknesses above, or below, this range can alternatively be used. Other suitable coatings, or no coatings, can alternatively be employed. For example, polytetrafluoroethylene (PTFE) can be used alone, or in combination, with plasma.

Finally, in one alternative embodiment (not shown) of a sealing apparatus, a seal roller can be employed that includes a seal configuration, such as a sinusoidal shape for example, that extends completely about the axis of the seal roller. Because the seal configuration in this example embodiment has no beginning or end, a substantially continuous seal can be formed in the direction that is transverse to the axis of the seal roller. For example, such a seal roller whose axis extends in the transverse direction can produce a substantially continuous seal in the machine direction. Thus, this example seal roller configuration may eliminate the need to perform multiple discrete sealing processes to create seals oriented in the machine direction. This sealing process can be combined with other processes, examples of which include the MD ring rolling noted in the aforementioned example, TD ring rolling, SELFing, and cutting.

D. Some Example Seal Configurations

As contemplated herein, plastic films can be sealed together in such a way that the resulting product, or portion of a product, includes one or more seals extending in one or more directions. The sealing process may be a heat sealing process that employs heat and pressure applied by a seal bar that defines a generally non-linear seal configuration, to form the seal by pressing the plastic films into contact with each other and melting the plastic films together. The seals may be oriented in, for example, one or both of the machine direction (MD), and the transverse direction (TD) which is generally orthogonal to the MD. Such seals can include, for example, a side seal at one or both sides of a product such as a plastic bag.

In at least some embodiments, a plastic product, such as a bag for example, may include a hem seal in addition to one or more side seals. As referred to herein, a hem seal refers to a seal, typically but not necessarily located near the top of a plastic bag for example, that creates a channel for a drawtape, used to close the end of the bag, to pass through. More generally however, a hem seal can be employed in any product where there is a need to enable a consumer to close off a portion of the product using a drawtape or comparable element. It should be noted that a hem seal is not required in any particular embodiment.

In terms of its construction, the hem seal(s), for example, of a plastic product can extend in the MD, while corresponding side seals of the same plastic product extend substantially in the TD. In other cases however, the hem seal(s) can be formed so as to extend substantially in the TD, while the side seals are formed so as to extend substantially in the MD. The hem seal can be formed at substantially the same time as one or more side seals, or one or more hem seals can be formed at a different time than one or more side seals. It should be noted that in any case, the scope of the invention is not limited to any particular orientation(s) of a seal however, and the foregoing are provided only by way of example.

Figure 4A:
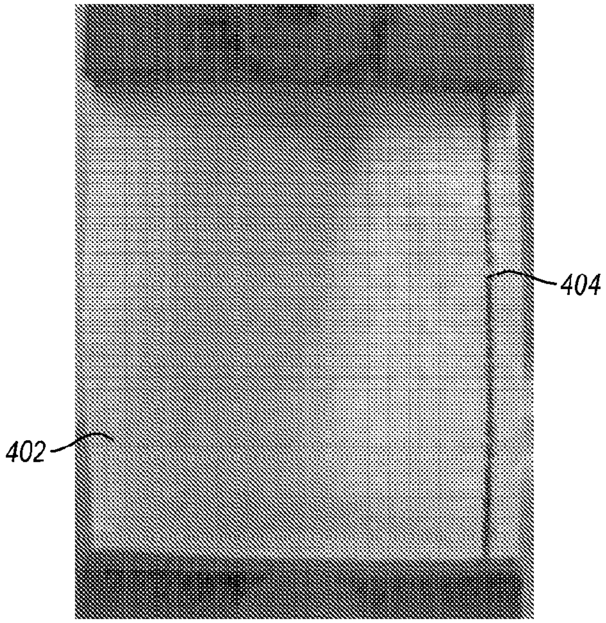
FIGS. 4A-4B illustrate some effects of elongation of a stretchable film on a seal that has a substantially linear configuration.
Figure 4B:
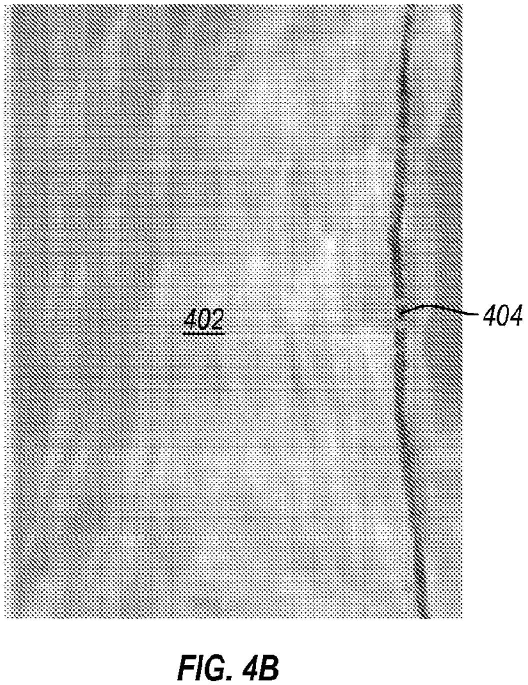

Turning now to FIGS. 4A-4B, which are presented for purposes of comparison, details are provided concerning some effects of elongation of a film 402, which is in the form of a stretchable film that may be used in products such as plastic bags for example, on a seal 404, which may be in the form of a side seal for example, that has a substantially linear configuration. As indicated in FIG. 4A, the film 402, which may include a web material comprising strainable networks, is in a generally unelongated state, and the seal 404 has a generally linear configuration and is not significantly distorted or deformed.

If the film 402 is employed in a bag for example, the film 402 may, as expected and intended, experience elongation as the bag is loaded. An elongated state of the film 402 is indicated in FIG. 4B. In that Figure, the structure of the film 402 can be seen. It is also apparent from FIG. 4B however, that the loading placed on the film 402 has significant effects. For example, because the seal 404 is relatively stronger than the film 402, such that the seal 404 responds differently than the film 402 to loading, the film 402 stretches preferentially relative to the seal 404, with the result that the portions of the film 402 in the vicinity of the seal 404 appear distorted and the seal 404 has distorted into an arc shaped configuration. As explained elsewhere herein, the preferential stretching of the film 402 in the vicinity of the seal 404 can cause pin holes and other structural problems in the film 402, and may also impair the integrity and performance of the seal 404.

Figure 4C:
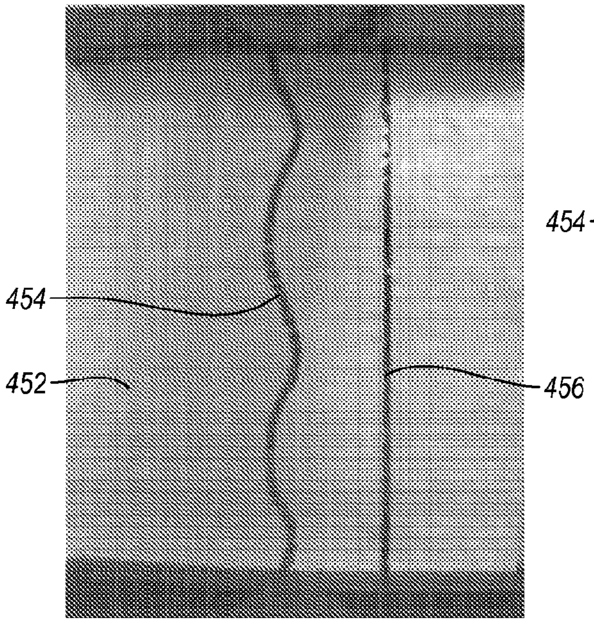
FIGS. 4C-4D illustrate aspects of the response of a seal having a non-linear configuration to elongation of a stretchable film with which the seal is employed.
Figure 4D:
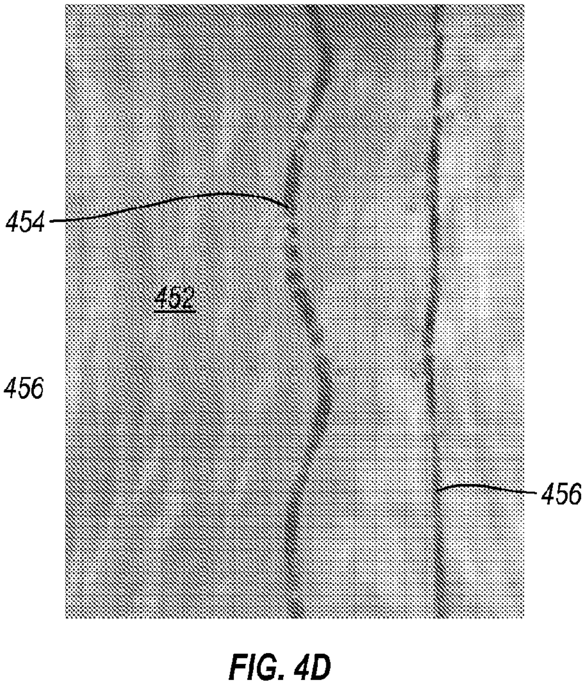

In contrast with the example of FIGS. 4A and 4B, the example of FIGS. 4C and 4D disclose a film 452 that includes a seal 454 having a length that is longer than the corresponding portion of the film 452. As indicated in FIG. 4C, the film 452, which may include a web material comprising strainable networks, is in a generally unelongated state, and the seal 454 has a generally serpentine shaped configuration and is not significantly distorted or deformed.

If the film 452 is employed in a bag for example, the film 452 may, as expected and intended, experience elongation as the bag is loaded. An elongated state of the film 452 is indicated in FIG. 4D. In that Figure, the structure of the film 452 can be seen, but in contrast with the example of FIG. 4B, neither the film 452 nor the seal 454 have been significantly distorted. Instead, the seal 454 has elongated consistently and generally in tandem with the film 452. By comparison, it can be seen from FIGS. 4A and 4B that the generally linear seal 456, and the surrounding portions of film 452, have experienced some distortion as a result of loading.

Figure 5A:
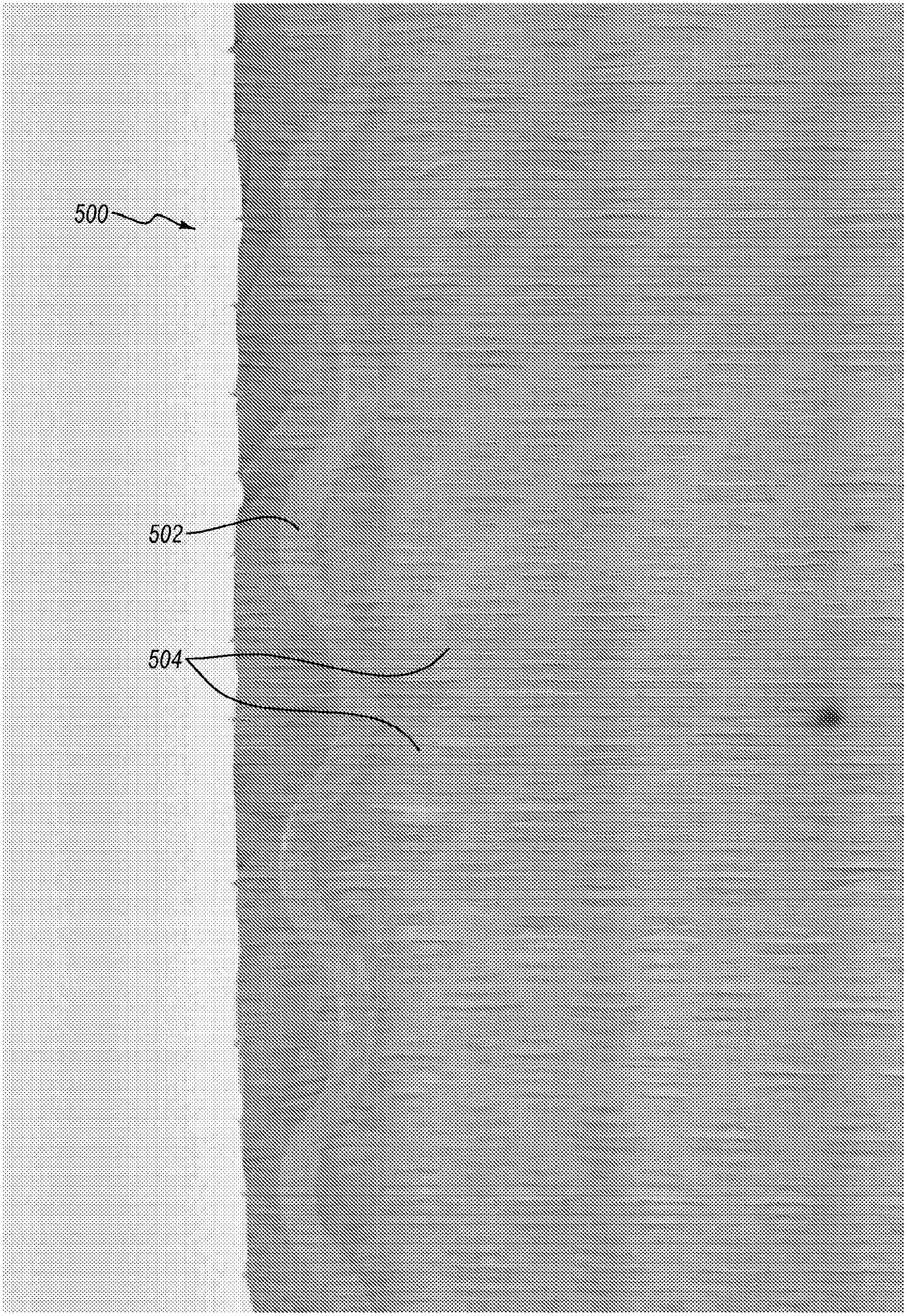
FIG. 5A discloses an example of two or more films sealed together using a sinusoidal seal in an un-stretched state.
Figure 5B:
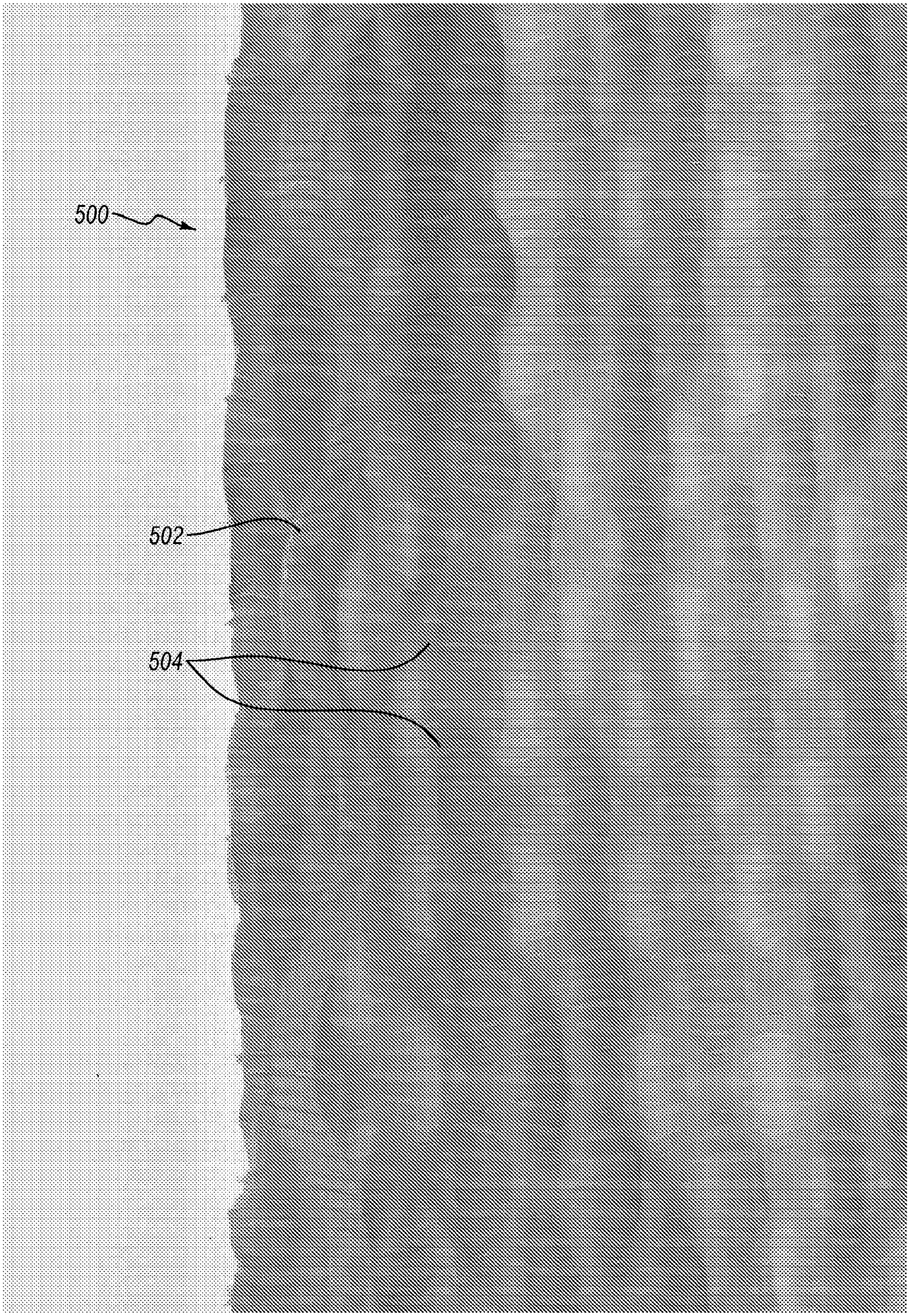
FIG. 5B discloses the example seal of FIG. 5A in a stretched state.

Directing attention now to FIGS. 5A and 5B, an example film 500 is disclosed that includes a seal 502 having a length that is longer than the corresponding portion of the film 500. As indicated in FIG. 5A, the film 500, which may include a web material 504 comprising strainable networks, such as is disclosed in the example of FIGS. 1C and 1D, is in a generally unelongated state, and the seal 502 has a generally serpentine shaped configuration and is not significantly distorted or deformed.

If the film 500 is employed in a bag for example, the film 500 may, as expected and intended, experience elongation as the bag is loaded. An elongated state of the film 500 is indicated in FIG. 5B. In that Figure, and in contrast with the example of FIG. 5A, neither the film 500 nor the seal 502 have been significantly distorted. Instead, the seal 502 has elongated consistently and generally in tandem with the film 500. By comparison, it can be seen from FIGS. 4A and 4B, discussed above, that the generally linear seal 456, and the surrounding portions of film 452, have experienced some distortion as a result of loading.

Figure 7:
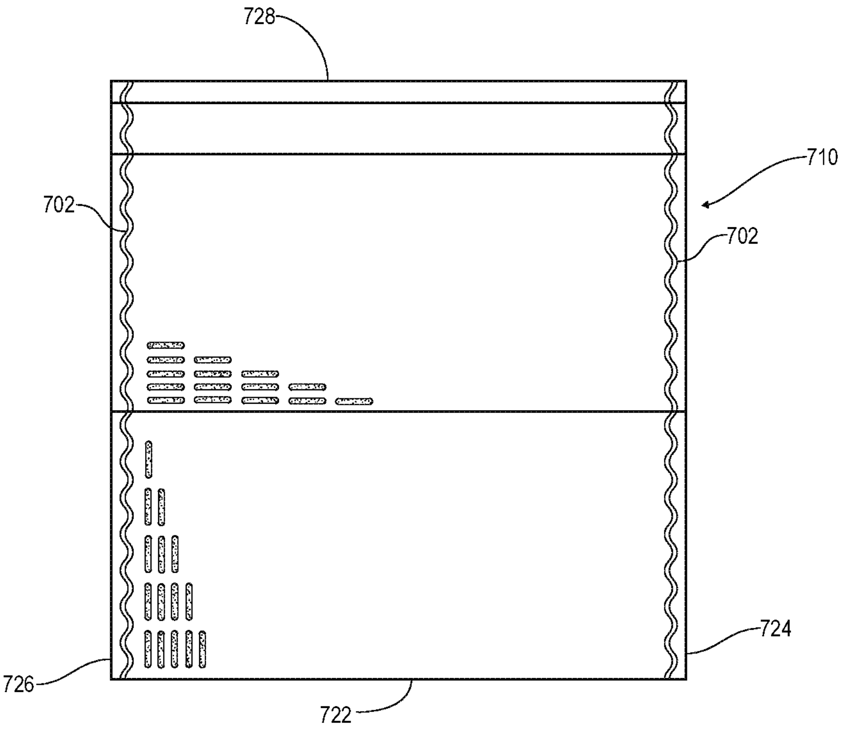
FIG. 7 is a front view of a bag having side seals with non-linear configurations.

Referring now to FIG. 7, a trash bag having side seals with non-linear configurations is shown. The bag 710 includes a bag body formed from a piece of flexible sheet material folded upon itself along fold line 722 and bonded to itself near side edges 724, 726 by side seals 702 to form a semi-enclosed container having an opening along edge 728. The side seals 702 have serpentine shape configurations and a seal length that is longer than the respective adjacent side edges 724, 726.

F. Example Production Processes

Consistent with the varied natures of films and associated seals disclosed herein, various processes, and combinations thereof, may be used in the associated production processes. Examples of such processes include, but are not limited to, heat bonding, ultrasonic bonding, adhesive bonding, incremental stretching, pressure bonding techniques such as machine direction (MD) ring rolling, transverse direction (TD) ring rolling, diagonal direction (DD) ring rolling, and any ring rolling and/or other process(es), like SELFing, that results in the formation of a film with strainable networks. Treatment with a corona discharge may be used to enhance any of the aforementioned methods. One or more of the separate films in a product can be flat film or can be subject to separate processes, such as stretching, slitting, coating and printing, and corona treatment.

More generally, any other process(es) that produces a plastic product that includes a non-linear seal configuration, or any other seal configuration where the seal is relatively longer than the elongated and/or unelongated length of two or more associated plastic films, may be employed, and the scope of the invention is not limited to any particular production process(es). A more detailed discussion of various specific examples of production processes that may be used in the production of the seal configurations disclosed herein is set forth below.

Figure 6:
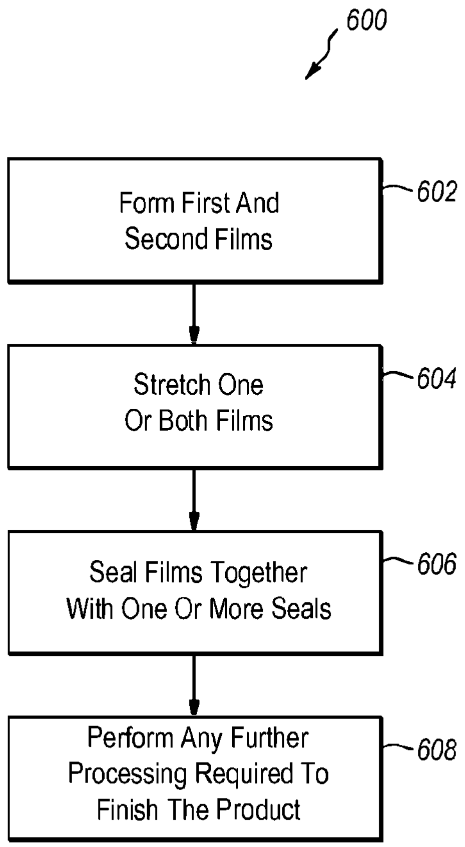
FIG. 6 discloses an example bag making and sealing process.

Directing attention now to FIG. 6, details are provided concerning an example sealing process 600. The process 600 may begin when at least a first and second film, such as plastic films, are formed 602. One or both of the films may comprise a plastic film that includes web materials with strainable networks, and/or any other cold-deformable structures. More generally however, one or both of the films can be any plastic film that is able to elongate under loading. In at least some instances, one or both of the plastic films are configured to elongate elastically, that is, temporarily, under load and can substantially reassume their unelongated configuration(s) after the load is removed.

In one particular example embodiment, the two films are attached to each other, such as by way of the method 600 for example, to form a plastic bag or other plastic product intended to hold solids and/or liquids. Of course, the scope of the invention is not limited to any particular product(s) however.

Once the films have been formed, they can be subjected to various types of processing. For example, one or both of the films, individually or together, can be subjected to one or more cold deformation processes. Thus, in one particular example of the method 600, one or both of the films are stretched 604. In at least some embodiments, both films are stretched together. As noted herein, this stretching can be performed by a variety of cold deformation processes, examples of which include, but are not limited to, MD ring rolling/SELFing, TD ring rolling/SELFing, DD ring rolling, and any combination of the foregoing.

In one particular example embodiment, both films are TD ring rolled together with each other. The TD ring rolling may be performed such that the films are stretched in a direction that corresponds to a lengthwise direction of an associated product, such as a plastic bag for example. Thus, the lengthwise direction of the bag, in this example, is the transverse direction, and the widthwise direction of the bag is the machine direction. Alternatively, the films can be stretched, by MD ring rolling, in a lengthwise direction of the bag, rather than a widthwise direction of the bag. These same considerations can be used in connection with an MD ring rolling process, that is, the films can be stretched in a lengthwise or widthwise direction of an associated bag, using an MD ring rolling process. In still other embodiments, the films can be subjected to both MD ring rolling and TD ring rolling, in any order.

Regardless of the type, or types, of cold deformation, such as the stretching performed 604 on the films, the affected film(s) may remain stretched until after completion of various other processes of the method 600. For example, and with continued reference to FIG. 6, the films may remain stretched while they are sealed 606 together, after which time the films may be allowed to relax.

In one alternative embodiment, the films, which may or may not have been already subjected to one or more cold deformation processes such as ring rolling, can be sealed together while they are in a relaxed state. Because the applied seal, or seals, is/are longer than the associated portions of the films in their relaxed state, the seal or seals can provide adequate performance when those films are elongated during use of the associated product, such as a plastic bag for example.

In general, the seal, or seals, created can be any seal that joins the two or more films together. As noted elsewhere herein with reference to the particular example of plastic bags, the seal, or seals, can be one or more hem seals and/or one or more side seals. In at least some instances, the seal, or seals, applied, can be generally transverse to a direction in which the films have been, or were, cold deformed, although that is not required in all cases. By way of illustration, if the films were cold deformed, such as by ring rolling for example, in the machine direction, the seal or seals are applied in the transverse direction. In the particular example of a plastic bag, the MD ring rolling may be performed in the widthwise direction of the plastic bag, and the seals applied 606 in a lengthwise direction of the bag, such that the seals comprise side seals.

As noted elsewhere herein, and exemplified in FIGS. 4A-4D discussed above, the seal or seals applied 606 may have a color that is different from the color of one or more of the film layers. Such colored seals can be produced, for example, by coating the sealing elements and/or as a result of a thermal reaction of the film layers to the heat used during the sealing process.

With continued reference to FIG. 6, the sealing 606 of the two or more films together can result in one, or more, seals. In general, the seal, or seals, each have a length that is greater than a length of an associated respective portion, such as a length or width for example, of a product in which the seal or seals is/are incorporated. By way of illustration, and not limitation, a hem seal formed by sealing 606 has a length greater than a width of a plastic bag that includes the hem seal, and/or a side seal formed by sealing 606 has a length greater than a length of a plastic bag that includes the side seal. Moreover, the sealing 606 can result in the creation of one or more seals having any of the configurations disclosed herein.

After the sealing has been performed 606, one or more additional processes may be performed 608 with respect to the film layers that have been sealed together. Such additional processes may include, in any order, any one or more of cutting, another sealing process, and one or more additional cold deformation processes, at least one of which may be a ring rolling process.

It should be noted that while certain processes are depicted in a particular sequence in FIG. 6, those processes need not necessarily be performed in the indicated sequence, nor should FIG. 6 be interpreted to require performance of those processes in the indicated sequence. In some alternative embodiments, the processes depicted in FIG. 6 may be performed in a different order, some processes may be omitted, and/or some processes may be added. As one example, the sealing process 606 may be performed prior to the stretching process 604.

E. Example Experimental Trial

An experimental trial was conducted to evaluate a sinusoidal-shaped side seal bar prototype on a thermoplastic trash bag film. The trial results are described below and refer to the attached "Appendix A," which is filed the same day herewith and incorporated herein in its entirety by this reference.

It should be noted that the trial was performed in connection with plastic films such as those used in products sold in connection with the ForceFlex® mark, examples of which are disclosed in the patents and applications incorporated herein, and which may be referred to in the trial results below simply as a film, or films. However, while the trial demonstrated good results with such films, it should be understood that the scope of invention is neither intended to be, nor is, limited to such films, nor is the scope of the invention limited to any particular products.

The specific thermoplastic film evaluated in the trial consisted of a blend of linear low density polyethylene and pigment in a co-extruded BAB layer structure. The C-folded film web was then subjected to TD SELFing (examples of such processes are disclosed in the patents and applications disclosed herein) at ambient temperature. The strainable network applied to the film web is in the transverse direction and remained in a relaxed state when the side seals were applied to create the remaining sides of a trash bag.

When the side seals are applied in this relaxed state, their final length is determined based on the relaxed pouch length of the film web. This differs greatly from the relaxed length when a consumer uses a stretchable bag that includes such a film, because the pouch length expands when items are placed inside the bag. To implement an embodiment of an altered side seal pattern, a sinusoidal seal bar was created. The smooth, sinusoidal pattern was chosen for its increased length as well as for its smooth edges. Those skilled in the art understand that sharp transitions or angles in plastic product design create stress concentrations. This initial pattern is designed to elongate with the film during use and to minimize stress concentrations along the side seal.

Samples of the sinusoidal side seal pattern, as shown in FIGS. 5A-5B, were collected on current commercial bag making equipment. These new sinusoidally shaped side seals were compared to a straight-line seal. These two different seal bar designs were alternated so that similar film samples could be used to compare them. Film thickness is known to be a large driver of film strength in tensile testing, so this setup allowed minimization of the natural thickness variation in the thermoplastic film.

Tensile testing inputs were adapted from ASTM standard methods to quantify benefit of the side seal samples created. Common test inputs used were: sample conditioning and testing at 72° F. and 50% Relative Humidity; 2" jaw separation; standard jaw clamps and pressure; and a crosshead speed of 20 in/min. To capture the strainable network effect and seal pattern difference for these samples, tensile film samples larger than the standard 1" wide were needed. Samples were cut into 3" by 3" squares and the crosshead jaws were approximately positioned ⅜" from the seal edge (sinusoidal seal edge was determined by the middle of the wave). This adapted test is designed to elongate the film material adjacent to the side seal to simulate elongation the bag would experience when subjected to a load such as may occur when the consumer places items inside the bag. The main measure monitored during this testing is Energy to Break (in*lbf). Break is determined as the maximum load of the film sample during testing. The sample was pulled in tensile testing frames until a 97% drop in load was measured. The Break point was then recorded as the maximum force before any sort of failure occurred. The Energy to Break was then calculated as the area under the Load-Extension curve.

Preliminary tensile Energy to Break data averaged 54.6 in*lbf for the sinusoidal seal pattern and 47.3 in*lbf for the straight-line seal pattern from the methodology described previously. This initial experiment yielded an increase of 15% in tensile energy to failure. A two-sample t-test concluded from this preliminary experiment that the mean of the sinusoidal pattern was greater than the standard pattern at the 0.05 level of significance. Based on this sample size, the increase of 7.3 in*lbf had a Power of greater than 70% in detecting a difference between these two samples.

F. Example Advantages of Some Embodiments

In light of the disclosure herein, it will be appreciated that embodiments of the invention may be advantageous in various ways relative to conventional structures and processes. Below are set forth various examples of some advantages that may be achieved in connection with one or more embodiments of the invention. It is not necessary that all of such examples be present in any particular embodiment, nor is it necessary that any particular example be present in an embodiment. Finally, it should be noted that the examples set forth below are provided solely by way of illustration and are not intended, nor should be construed, to limit the scope of the invention in any way.

With regard now to some possible advantages of example embodiments, one or more embodiments of the invention may, in general, provide a seal having a non-linear configuration such that when an associated plastic article to which the seal is attached is elongated, the seal is able to respond to the elongation such that the performance and integrity of both the seal and the material of the plastic article, and especially the material in the vicinity of the seal, are substantially maintained. As well, the seal may have a color that contrasts with the plastic product to which it is attached. The contrasting color may provide visible reassurance to the consumer as to the strength and reliability of the seal and the product. Likewise, other aspects such as the width and the non-linear shape of the seal may provide similar assurances.

The present invention may be embodied in other specific forms without departing from its spirit or essential characteristics. For example, the illustrated and described implementations involve non-continuous (i.e., discontinuous or partially discontinuous lamination) to provide the light bonds. In alternative implementations, the lamination may be continuous. For example, films could be co-extruded so that the films have a bond strength that provides for delamination prior to film failure to provide similar benefits to those described above. Thus, the described embodiments are to be considered in all respects only as illustrative and not restrictive. All changes that come within the meaning and range of equivalency of the claims are to be embraced within their scope.

The invention claimed is:

1. A thermoplastic bag comprising:

a first thermoplastic sidewall;

a second thermoplastic sidewall joined to the first thermoplastic sidewall along a first linear side edge, a second linear side edge, and a bottom edge;

an opening opposite the bottom edge and between the first thermoplastic sidewall and the second thermoplastic sidewall;

a plurality of rib-like elements formed in the first and second thermoplastic sidewalls that allow the first and second thermoplastic sidewalls to elongate in an elongation direction; and a heat seal securing the first and second thermoplastic sidewalls together at the first linear side edge, wherein the heat seal extends continuously from a top edge of the thermoplastic bag to the bottom edge of the thermoplastic bag along the first and second thermoplastic sidewalls, wherein the heat seal comprises:

a seal length longer than a linear distance between the top edge and the bottom edge; and a non-linear configuration in a relaxed state, wherein when a load is imposed that causes the thermoplastic bag to expand and elongate, the heat seal elongates in the elongation direction due to the non-linear configuration.

2. The thermoplastic bag as recited in claim 1, wherein the plurality of rib-like elements comprise a strainable network.

3. The thermoplastic bag as recited in claim 1, wherein the heat seal has a sinusoidal configuration.

4. The thermoplastic bag as recited in claim 1, wherein the heat seal has a zigzag or serpentine configuration.

5. The thermoplastic bag as recited in claim 1, wherein the heat seal comprises a side seal.

6. The thermoplastic bag as recited in claim 5, wherein the linear distance is a height of the thermoplastic bag from the top edge to the bottom edge.

7. The thermoplastic bag as recited in claim 1, further comprising an additional heat seal comprising a hem seal.

8. The thermoplastic bag as recited in claim 7, wherein the additional heat seal extends continuously from the first linear side edge of the thermoplastic bag to the second linear side edge of the thermoplastic bag, and wherein the additional heat seal comprises a seal length longer than a width of the thermoplastic bag from the first linear side edge to the second linear side edge.

9. The thermoplastic bag as recited in claim 1, wherein the heat seal comprises a color that differs from a color of the first and second thermoplastic sidewalls.

10. The thermoplastic bag as recited in claim 1, wherein the non-linear configuration of the heat seal lies within a plane comprising a machine direction and a transverse direction of the first thermoplastic sidewall.

11. The thermoplastic bag as recited in claim 1, wherein the heat seal comprises a melted portion of the first thermoplastic sidewall and a melted portion of the second thermoplastic sidewall.

12. A thermoplastic bag comprising:

a first thermoplastic sidewall;

a second thermoplastic sidewall joined to the first thermoplastic sidewall along a first side edge, a second side edge, and a bottom edge;

an opening opposite the bottom edge and between the first thermoplastic sidewall and the second thermoplastic sidewall;

a plurality of rib-like elements formed in the first and second thermoplastic sidewalls that allow the first and second thermoplastic sidewalls to elongate in an elongation direction; and a heat seal securing a first portion of the first thermoplastic sidewall together with a second portion of the first thermoplastic sidewall folded over the first portion of the first thermoplastic sidewall in a hem of the thermoplastic bag, wherein the heat seal extends continuously from the first side edge of the thermoplastic bag to the second side edge of the thermoplastic bag along the first and second thermoplastic sidewalls, wherein the heat seal comprises:

a seal length longer than a linear distance between the first side edge and the second side edge; and a non-linear configuration in a relaxed state, wherein when a load is imposed that causes the thermoplastic bag to expand and elongate, the heat seal elongates in the elongation direction due to the non-linear configuration.

13. The thermoplastic bag as recited in claim 12, wherein the plurality of rib-like elements comprise a strainable network.

14. The thermoplastic bag as recited in claim 12, wherein the heat seal has a sinusoidal configuration.

15. The thermoplastic bag as recited in claim 12, wherein the heat seal has a zigzag or serpentine configuration.

16. The thermoplastic bag as recited in claim 12, wherein the heat seal comprises a hem seal.

17. The thermoplastic bag as recited in claim 16, wherein the linear distance is a width of the thermoplastic bag from the first side edge to the second side edge.

18. The thermoplastic bag as recited in claim 12, wherein the heat seal comprises a color that differs from a color of the first and second thermoplastic sidewalls.

19. The thermoplastic bag as recited in claim 12, wherein the non-linear configuration of the heat seal lies within a plane comprising a machine direction and a transverse direction of the first thermoplastic sidewall.

20. The thermoplastic bag as recited in claim 12, wherein the heat seal comprises a melted portion of the first portion of the first thermoplastic sidewall and a melted portion of the second portion of the first thermoplastic sidewall.

* * * * *